(12) United States Patent
Cohen et al.

(10) Patent No.: US 11,714,416 B2
(45) Date of Patent: *Aug. 1, 2023

(54) METHOD OF NAVIGATING A VEHICLE AND SYSTEM THEREOF

(71) Applicant: ELTA SYSTEMS LTD., Ashdod (IL)

(72) Inventors: Ofir Cohen, Tzelafon (IL); Dina Appelman, Bat-Yam (IL); Arnon Degani, Kibbutz Ramat David (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,689

(22) Filed: Apr. 13, 2022

(65) Prior Publication Data

US 2022/0236735 A1 Jul. 28, 2022

Related U.S. Application Data

(63) Continuation of application No. 16/619,173, filed as application No. PCT/IL2018/050620 on Jun. 7, 2018, now Pat. No. 11,320,823.

(30) Foreign Application Priority Data

Jun. 8, 2017 (IL) .......................................... 252769

(51) Int. Cl.
*G05D 1/02* (2020.01)
*B60W 60/00* (2020.01)
(Continued)

(52) U.S. Cl.
CPC ......... *G05D 1/0212* (2013.01); *B60W 60/001* (2020.02); *G01C 21/188* (2020.08);
(Continued)

(58) Field of Classification Search
CPC .. G05D 1/0212; G05D 1/0088; G05D 1/0248; G05D 1/0255; G05D 1/0257;
(Continued)

(56) References Cited

U.S. PATENT DOCUMENTS 5,006,988 A 4/1991 Borenstein et al.
5,677,836 A 10/1997 Bauer
(Continued)

FOREIGN PATENT DOCUMENTS

EP 2891899 A1 7/2015

*Primary Examiner* — Rodney A Butler
(74) *Attorney, Agent, or Firm* — Browdy and Neimark, PLLC

(57) ABSTRACT

The disclosed subject matter includes a method and system for navigating an unmanned ground vehicle (UGV), that include:
generating, based on the scanning output data, a first map comprising a first group of cells and characterized by a first size;
generating, based on the scanning output data, a second map representing an area smaller than that of the first map comprising a second group of cells, which are characterized by a second size being smaller than the first size; wherein each cell in the first group of cells and the second group of cells is classified to a class selected from at least two classes, comprising traversable and non-traversable, wherein the second part at least partly overlaps the first part; navigating the UGV based on data deduced from crossing between cells in the first map and second map.

24 Claims, 6 Drawing Sheets

(51) Int. Cl.
  *G01C 21/30* (2006.01)
  *G05D 1/00* (2006.01)
  *G01C 21/18* (2006.01)
  *G01C 21/16* (2006.01)

(52) U.S. Cl.
  CPC ........... *G01C 21/30* (2013.01); *G05D 1/0088* (2013.01); *B60W 2420/42* (2013.01); *B60W 2420/52* (2013.01); *B60W 2420/54* (2013.01); *G05D 1/0248* (2013.01); *G05D 1/0255* (2013.01); *G05D 1/0257* (2013.01)

(58) Field of Classification Search
  CPC ...... G05D 1/024; G05D 1/027; G05D 1/0274; B60W 60/001; B60W 2420/42; B60W 2420/52; B60W 2420/54; G01C 21/188; G01C 21/30; G01C 21/16
  See application file for complete search history.

(56) References Cited

U.S. PATENT DOCUMENTS

| | | |
|---|---|---|
| 8,234,068 B1 | 7/2012 | Young |
| 9,639,960 B1 | 5/2017 | Loveland et al. |
| 2004/0105579 A1 | 6/2004 | Ishii et al. |
| 2004/0175042 A1 | 9/2004 | Kroeker et al. |
| 2007/0005306 A1 | 1/2007 | Foessel |
| 2009/0149990 A1 | 6/2009 | Myeong et al. |
| 2010/0066587 A1 | 3/2010 | Yamauchi et al. |
| 2011/0288684 A1 | 11/2011 | Farlow et al. |
| 2013/0006484 A1 | 1/2013 | Avitzur et al. |
| 2013/0211656 A1 | 8/2013 | An |
| 2020/0033155 A1 | 1/2020 | Appelman et al. |

METHOD OF NAVIGATING A VEHICLE AND SYSTEM THEREOF

TECHNICAL FIELD

The presently disclosed subject matter relates to autonomous navigation in general, and more particularly to navigating an unmanned vehicle.

BACKGROUND

In general, an unmanned ground vehicle (UGV), also referred to as an uncrewed vehicle is a mobile machine that travels by integrating sensory data with computer-based decision making for the purpose of autonomously driving the vehicle. The vehicle can in some cases carry passengers, e.g. operators that cannot see the surrounding environment and/or manoeuvre the vehicle.

Generally, UGVs comprise various sensors for obtaining information on the surrounding environment, as well as various sub-systems for operating, controlling and communicating with the vehicle.

One issue related to UGV operation is autonomous navigation. When navigating the vehicle, information with respect to obstacles which are located within the traversed area is used for determining a route that avoids obstacles, to enable the vehicle to safely travel through the area. An obstacle can be any area or object which should be avoided. For example, an obstacle can be an object or area which either blocks or endangers the vehicle, e.g. slopes, holes in the ground, water reservoirs, walls, big rocks, overhead obstacles e.g., bridges, etc. Obstacles can also be any area which is desired to be avoided (e.g. noxious areas, habitat areas which should be avoided for ecological or animal conservation reasons, human populated areas which should be avoided for safety reasons, etc.)

When planning a path to a destination, the path should avoid obstacles, and possibly also comply with other limitations, for example be efficient, e.g., should not be elongated unnecessarily. Additionally, due to the near-real-time requirements of navigation tasks and the limited processing power available at the UGV, planning and tracking a path should be efficient in terms of processing time, processing power, data storage and other resources.

GENERAL DESCRIPTION

The disclosure relates to navigating a UGV within an area, in the presence of obstacles. Known methods include generating a representation of the area, such as a map or any other internal data structure, the representation comprising indications of the obstacles and a destination of the navigation. The map can then be used for planning a path which leads to the destination while avoiding obstacles. During actual navigation, steering commands to the UGV can be generated for following the path.

An inherent tradeoff exists between resources such as storage, time and processing power, required for generating a map and using the map for navigating a UGV, on the one hand, and the size of the area represented by the map as well as the map resolution, on the other hand. The larger the area and/or the higher the resolution, the more resources are required for generating a map, planning a path based on the map and controlling a UGV in accordance with the path. In particular, in the presence of obstacles, a high resolution map may be required, since the UGV may have to go through narrow passes or otherwise pass close to obstacles.

Additionally, the target destination of the UGV may be at a significant distance away from a current location, such that a map representing a suitably large area may be required. However, the computing resources available for a UGV may be limited, and the processing time may also be restricted since real time (or near real time) processing and vehicle control may be required. Thus, it may be impractical to use a large map which is also of high resolution.

Some examples of the disclosed subject matter relate to the simultaneous generation and usage of two or more maps, wherein one map, referred to herein as "the large map", represents an area to be navigated in at a first resolution, and another map, referred to herein as "the small map", represents a smaller area than that of the first map, at a second resolution, the second resolution being greater than the first resolution. Each map can be represented as, or can comprise a grid, in which each cell is classified as being associated with an area containing an obstacle (or part thereof) or not containing an obstacle, e.g., as non-traversable or traversable, respectively. It will be appreciated that, according to examples of the presently disclosed subject matter, if an obstacle takes up even a fraction of a cell, the cell (the entire cell area) is classified as non-traversable. The cells of the small map represent smaller areas than those of the large map. The small map and the large map can at least partially overlap, wherein correlation exists, which maps, within the overlapped parts, each cell in the small map, to one or more cells in the large map, and vice versa.

The maps can be created based on information provided by a scanning device which scans the areas surrounding the UGV. Thus, each map can be centered around a current location of the UGV. The small map can represent areas adjacent to the UGV at high resolution, while the large map represents the same areas as well as further areas in one or more directions, at lower resolution. The two maps can be continuously updated as the UGV advances and readings are received from the scanning device, which continuously scans the area around the UGV.

The large map can be used for planning a path from a current location to a target destination, while the small map can be used when the UGV is tracking the path for providing accurate steering instructions to the UGV.

In accordance with some examples of the disclosure, planning and tracking the path, using either map, can use crossed information, i.e., information obtained from the other map which relates to obstacles in the corresponding area of the used map.

As mentioned above, although an obstacle in any one of the maps is indicated as taking up at least one cell, it can be smaller. For example, an obstacle in the large map can be significantly smaller than the area represented by a cell in the large map, even to a degree that it can be ignored or overrun. This information can sometimes be obtained by crossing the information on the obstacle from the large map, with corresponding information from the small map. For instance, by determining the area that an obstacle takes up in the small map, for example one or more cells, it can be deduced that the total area of the obstacle is significantly smaller than the area represented by a cell of the large map, and can in certain cases be treated accordingly.

In another example, using the small map, it may not be known whether an obstacle located at an edge of the small map extends beyond the area represented by the small map, and is actually larger than it seems based on information from the small map. This can be resolved based on information obtained from the corresponding area in the large map.

Thus, an aspect of the disclosed subject matter relates to a method of navigating an unmanned ground vehicle (UGV), the vehicle comprising a scanning device, the method comprising: scanning an area surrounding the UGV; operating a processor for generating, based on the data provided by the scanning, a first map and a second map representing a first part and a second part of the area, respectively the first part and the second part at least partially overlap, the first map and the second map being relative to a location of the UGV; the first map comprises a first group of cells of a first size and the second map comprises a second group of cells of a second size, the first size larger than the second size; classifying cells in the first group of cells or the second group of cells as traversable or non-traversable; crossing between non-traversable cells in the first group of cells and corresponding cells in the second group of cells; deducing, from the crossing, data indicative of whether a size of a non-traversable area includes an area which is smaller than the size of the one or more cells from the first group of cells; and navigating the UGV in accordance with data obtained from the crossing.

Another aspect of the disclosed subject matter relates to a method of navigating an unmanned ground vehicle (UGV), the vehicle comprising a scanning device and an Inertial Navigation System (INS) being operatively connected to a processor, the method comprising: operating the scanning device for executing scanning operations, comprising scanning an area surrounding the UGV, to thereby generate respective scanning output data; operating the processor for generating, based on the scanning output data, a first map representing a first part of the area, the first map being relative to a location of the UGV and comprising a first group of cells, each of the first group of cells representing part of the first part of the area and characterized by a first size being larger than an accumulated drift value of the INS over a predefined distance, wherein each of the first group of cells is classified to a class selected from at least two classes, comprising traversable and non-traversable; operating the processor for generating, based on the scanning output data, a second map representing a second part of the area, the second part being smaller than the first part, the second map being relative to the location of the UGV and comprising a second group of cells, each of the second group of cells representing a part of the second part of the area and characterized by a second size being smaller than the first size and wherein each of the second group of cells is classified to a class selected from at least two classes, comprising traversable and non-traversable, wherein the second part at least partly overlaps the first part; crossing between one or more cells from the first group of cells that is classified as non-traversable and one or more corresponding cells from the second group of cells; deducing, from the crossing, data indicative of whether a size of a non-traversable area includes an area which is smaller than the size of the one or more cells from the first group of cells; receiving INS data indicative of a current location of the UGV relative to a previous location; updating a location of the UGV relative to non-traversable cells based on the first map and the second map; navigating the UGV in accordance with data obtained from the crossing.

In addition to the above features, the method according to this aspect of the presently disclosed subject matter can optionally comprise one or more of features (i) to (xvii) listed below, in any technically possible combination or permutation:

i). Crossing between one or more second cells from the second group of cells that is classified as non-traversable and one or more corresponding cells from the first group of cells; and deducing, from the crossing, data indicative of whether a size of a non-traversable area includes an area represented by the second cell is greater than the size of the second cell.

ii). Navigating the UGV comprises generating or updating a path to a destination.

iii). Navigating the UGV comprises determining steering commands for controlling movement of the UGV within the area.

iv). Navigating the UGV is performed in accordance with at least the second map and the data obtained from the crossing.

v). Wherein INS data is received repeatedly.

vi). Comprising navigating the UGV in accordance with at least the second map and the information.

vii). Wherein the first map or the second map is generated by accumulating scanning output data in an advancement direction of the UGV as the UGV advances into the area, and omitting representation of areas in an opposite direction beyond a scanning range.

viii). Repeatedly obtaining a path to a destination of the UGV; and
updating the path using the large map and the small map.

ix). Determining the path to the destination, the path determined so as to avoid non-traversable cells.

x). Determining the path to the destination, the path determined so as to avoid dangerous slopes.

xi). Receiving a current location of the UGV and a destination location in absolute coordinates; and
determining the path based on the current location and the destination location.

xii). Identifying the destination location based on a predetermined mark, and wherein the path is determined from a current location to the destination location.

xiii). Displaying a representation of the map including non-traversable cells, an indication of a location of the UGV, and the path.

xiv). Wherein the predefined distance is selected to exceed a maximal distance expected to be travelled by the UGV between consecutive map updates.

xv). Wherein the predefined distance is equal to a dimension of the area represented by the first map.

xvi). Wherein the predefined distance is equal to part (for example half) a dimension of the area represented by the first map.

xvii). Wherein the updating is performed for each INS data received.

According to another aspect of the presently disclosed subject matter there is provided a system mountable on an unmanned ground vehicle (UGV), comprising: a scanning device for scanning an area surrounding the UGV, to thereby provide scanning output data providing information on distances between objects in the area and the UGV in a multiplicity of directions; an INS for providing data indicative of a current location of the UGV relative to a previous location; a processor configured to: operate the scanning device for executing scanning operations, comprising scanning an area surrounding the UGV, to thereby generate respective scanning output data; generate, based on the scanning output data, a first map representing a first part of the area, the first map being relative to a location of the UGV and comprising a first group of cells, each of the first group of cells representing part of the first part of the area and characterized by a first size being larger than an accumulated drift value of the INS over a predefined distance, wherein each of the first group of cells is classified to a class selected from at least two classes, comprising traversable and non-traversable; generate, based on the scanning output data, a second map representing a second part of the area, the second part being smaller than the first part, the second map being relative to the location of the UGV and comprising a second group of cells, each of the second cells representing a part of the second part of the area and characterized by a second size being smaller than the first size and wherein each of the second group of cells is classified to a class selected from at least two classes, comprising traversable and non-traversable, wherein the second part at least partly overlaps the first part cross between one or more cells from the first group of cells that is classified as non-traversable and one or more corresponding cells from the second group of cells; deduce, from the crossing, data indicative of whether a size of a non-traversable area includes an area which is smaller than the size of the one or more cells from the first group of cells; receive INS data indicative of a current location of the UGV relative to a previous location; update a location of the UGV relative to non-traversable cells on the first map and on the second map; and navigate the UGV in accordance with data obtained from the crossing.

According to another aspect of the presently disclosed subject matter there is provided an unmanned ground vehicle (UGV), comprising: an INS for providing data indicative of a current location of the UGV relative to a previous location; a scanning device for scanning an area surrounding the UGV, the area having at least predefined area dimensions, to thereby provide scanning output data providing information on distances between objects in the area and the UGV in a multiplicity of directions; and a processor configured to: operate the scanning device for executing scanning operations, comprising scanning an area surrounding the UGV, to thereby generate respective scanning output data; generate, based on the scanning output data, a first map representing a first part of the area, the first map being relative to a location of the UGV and comprising a first group of cells, each of the first group of cells representing part of the first part of the area and characterized by a first size being larger than an accumulated drift value of the INS over a predefined distance, wherein each of the first group of cells is classified to a class selected from at least two classes, comprising traversable and non-traversable; generate, based on the scanning output data, a second map representing a second part of the area, the second part being smaller than the first part, the second map being relative to the location of the UGV and comprising a second group of cells, each of the second group of cells representing a part of the second part of the area and characterized by a second size being smaller than the first size and wherein each of the second group of cells is classified to a class selected from at least two classes, comprising traversable and non-traversable, wherein the second part at least partly overlaps the first part cross between one or more cells from the first group of cells that is classified as non-traversable and one or more corresponding cells from the second group of cells; deduce, from the crossing, data indicative of whether a size of a non-traversable area includes an area which is smaller than the size of the one or more cells from the first group of cells; receive INS data indicative of a current location of the UGV relative to a previous location; update a location of the UGV relative to non-traversable cells on the first map and on the second map; and navigate the UGV in accordance with data obtained from the crossing.

According to another aspect of the presently disclosed subject matter there is provided a computer program product comprising a computer readable storage medium retaining program instructions, whose program instructions, when read by a processor, cause the processor to perform a method comprising: obtaining scanning output data, the scanning output data generated by a scanning device associated with a UGV and executing scanning operations, comprising scanning an area surrounding a UGV, to thereby generate the respective scanning output data; operating the processor for generating, based on the scanning output data, a first map representing a first part of the area, the first map being relative to a location of the UGV and comprising a first group of cells, each of the first group of cells representing part of the first part of the area and characterized by a first size being larger than an accumulated drift value of the INS over a predefined distance, wherein each of the first group of cells is classified to a class selected from at least two classes, comprising traversable and non-traversable; operating the processor for generating, based on the scanning output data, a second map representing a second part of the area, the second part being smaller than the first part, the second map being relative to the location of the UGV and comprising a second group of cells, each of the second group of cells representing a part of the second part of the area and characterized by a second size being smaller than the first size and wherein each of the second group of cells is classified to a class selected from at least two classes, comprising traversable and non-traversable, wherein the second part at least partly overlaps the first part; crossing between one or more cells from the first group of cells that is classified as non-traversable and one or more corresponding cells from the second group of cells; deducing, from the crossing, data indicative of whether a size of a non-traversable area includes an area which is smaller than the size of the one or more cells from the first group of cells; receiving INS data indicative of a current location of the UGV relative to a previous location; updating a location of the UGV relative to non-traversable cells on the first map and on the second map; and navigating the UGV in accordance with data obtained from the crossing.

The system, the UGV and the computer program product disclosed in accordance with the aspects of the presently disclosed subject matter detailed above can optionally comprise one or more of features (i) to (xvii) listed above, mutatis mutandis, in any technically possible combination or permutation.

Another aspect of the disclosed subject matter relates to a method of navigating an unmanned ground vehicle (UGV), the vehicle comprising a scanning device being operatively connected to a processor, the method comprising: operating the scanning device for executing scanning operations, comprising scanning an area surrounding the UGV, to thereby generate respective scanning output data; operating the processor for generating, based on the scanning output data, a first map representing a first part of the area, the first map being relative to a location of the UGV and comprising a first group of cells, each of the first group of cells representing part of the first part of the area, wherein each of the first group of cells is classified to a class selected from at least two classes, comprising traversable and non-traversable; operating the processor for generating, based on the scanning output data, a second map representing a second part of the area, the second part being smaller than the first part, the second map being relative to the location of the UGV and comprising a second group of cells, each of the second group of cells representing a part of the second part of the area and characterized by a second size being smaller than the first size and wherein each of the second group of cells is classified to a class selected from at least two classes, comprising traversable and non-traversable, wherein the second part at least partly overlaps the first part crossing between one or more cells from the first group of cells that is classified as non-traversable and one or more corresponding cell from the second group of cells; deducing from the crossing, data indicative of whether a size of a non-traversable area includes an area which is smaller than the size of the one or more cells from the first group of cells; updating a location of the UGV relative to non-traversable cells based on the first map and the second map; and navigating the UGV in accordance with data obtained from the crossing.

According to another aspect of the presently disclosed subject matter there is provided a system mountable on an unmanned ground vehicle (UGV), comprising: a scanning device for scanning an area surrounding the UGV, to thereby provide scanning output data providing information on distances between objects in the area and the UGV in a multiplicity of directions; a processor configured to operate the scanning device for executing scanning operations, comprising scanning an area surrounding the UGV, to thereby generate respective scanning output data; generate, based on the scanning output data, a first map representing a first part of the area, the first map being relative to a location of the UGV and comprising a first group of cells, each of the first group of cells representing part of the first part of the area, wherein each of the first group of cells is classified to a class selected from at least two classes, comprising traversable and non-traversable; generate, based on the scanning output data, a second map representing a second part of the area, the second part being smaller than the first part, the second map being relative to the location of the UGV and comprising a second group of cells, each of the second cells representing a part of the second part of the area and characterized by a second size being smaller than the first size and wherein each of the second group of cells is classified to a class selected from at least two classes, comprising traversable and non-traversable, wherein the second part at least partly overlaps the first part;

crossing between one or more cells from the first group of cells that is classified as non-traversable and one or more corresponding cells from the second group of cells; deducing, from the crossing, data indicative of whether a size of a non-traversable area includes an area which is smaller than the size of the one or more cells from the first group of cells; updating a location of the UGV relative to non-traversable cells on the first map and on the second map; and navigating the UGV in accordance with data obtained from the crossing.

According to another aspect of the presently disclosed subject matter there is provided an unmanned ground vehicle (UGV), comprising: a scanning device for scanning an area surrounding the UGV, the area having at least predefined area dimensions, to thereby provide scanning output data providing information on distances between objects in the area and the UGV in a multiplicity of directions; and a processor configured to operate the scanning device for executing scanning operations, comprising scanning an area surrounding the UGV, to thereby generate respective scanning output data; generate, based on the scanning output data, a first map representing a first part of the area, the first map being relative to a location of the UGV and comprising a first group of cells, each of the first group of cells representing part of the first part of the area and characterized by a first size being larger than an accumulated drift value of the INS over a predefined distance, wherein each of the first group of cells is classified to a class selected from at least two classes, comprising traversable and non-traversable; generate, based on the scanning output data, a second map representing a second part of the area, the second part being smaller than the first part, the second map being relative to the location of the UGV and comprising a second group of cells, each of the second group of cells representing a part of the second part of the area and characterized by a second size being smaller than the first size and wherein each of the second group of cells is classified to a class selected from at least two classes, comprising traversable and non-traversable, wherein the second part at least partly overlaps the first part cross between one or more cells from the first group of cells that is classified as non-traversable and one or more corresponding cells from the second group of cells; deduce, from the crossing, data indicative of whether a size of a non-traversable area includes an area which is smaller than the size of the one or more cells from the first group of cells; update a location of the UGV relative to non-traversable cells on the first map and on the second map; and navigate the UGV in accordance with data obtained from the crossing.

According to another aspect of the presently disclosed subject matter there is provided a computer program product comprising a computer readable storage medium retaining program instructions, whose program instructions, when read by a processor, cause the processor to perform a method comprising: obtaining scanning output data, the scanning output data generated by a scanning device associated with a UGV and executing scanning operations, comprising scanning an area surrounding a UGV, to thereby generate the respective scanning output data; operating the processor for generating, based on the scanning output data, a first map representing a first part of the area, the first map being relative to a location of the UGV and comprising a first group of cells, each of the first group of cells representing part of the first part of the area, wherein each of the first group of cells is classified to a class selected from at least two classes, comprising traversable and non-traversable; operating the processor for generating, based on the scanning output data, a second map representing a second part of the area, the second part being smaller than the first part, the second map being relative to the location of the UGV and comprising a second group of cells, each of the second group of cells representing a part of the second part of the area and characterized by a second size being smaller than the first size and wherein each of the second group of cells is classified to a class selected from at least two classes, comprising traversable and non-traversable, wherein the second part at least partly overlaps the first part; crossing between one or more cells from the first group of cells that is classified as non-traversable and one or more corresponding cells from the second group of cells; deducing, from the crossing, data indicative of whether a size of a non-traversable area includes an area which is smaller than the size of the one or more cells from the first group of cells; updating a location of the UGV relative to non-traversable cells on the first map and on the second map; and navigating the UGV in accordance with data obtained from the crossing.

The method, system, UGV and computer program product disclosed in accordance with the aspects of the presently disclosed subject matter detailed above can optionally comprise one or more of features (i) to (xvii) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "determining", "representing", "comparing", "generating", "assessing", "matching", "updating", "creating" or the like, refer to the action(s) and/or process(es) of a computer that manipulate and/or transform data into other data, said data represented as physical, such as electronic, quantities and/or said data representing the physical objects.

The terms "processor", "computer", "processing unit" or the like should be expansively construed to include any kind of electronic device with data processing circuitry, which includes a computer processor as disclosed herein below (e.g., a Central Processing Unit (CPU), a microprocessor, an electronic circuit, an Integrated Circuit (IC), firmware written for or ported to a specific processor such as digital signal processor (DSP), a microcontroller, a field programmable gate array (FPGA), an application specific integrated circuit (ASIC), etc.) and possibly a computer memory and is capable of executing various data processing operations.

The operations in accordance with the teachings herein may be performed by a computer specially constructed for the desired purposes or by a general-purpose computer specially configured for the desired purpose by a computer program stored in a computer readable storage medium.

In the following detailed description, numerous specific details are set forth in order to provide a thorough understanding of the invention. However, it will be understood by those skilled in the art that the presently disclosed subject matter can be practiced without these specific details. In other instances, well-known methods, procedures, components and circuits have not been described in detail so as not to obscure the presently disclosed subject matter.

Figure 3:
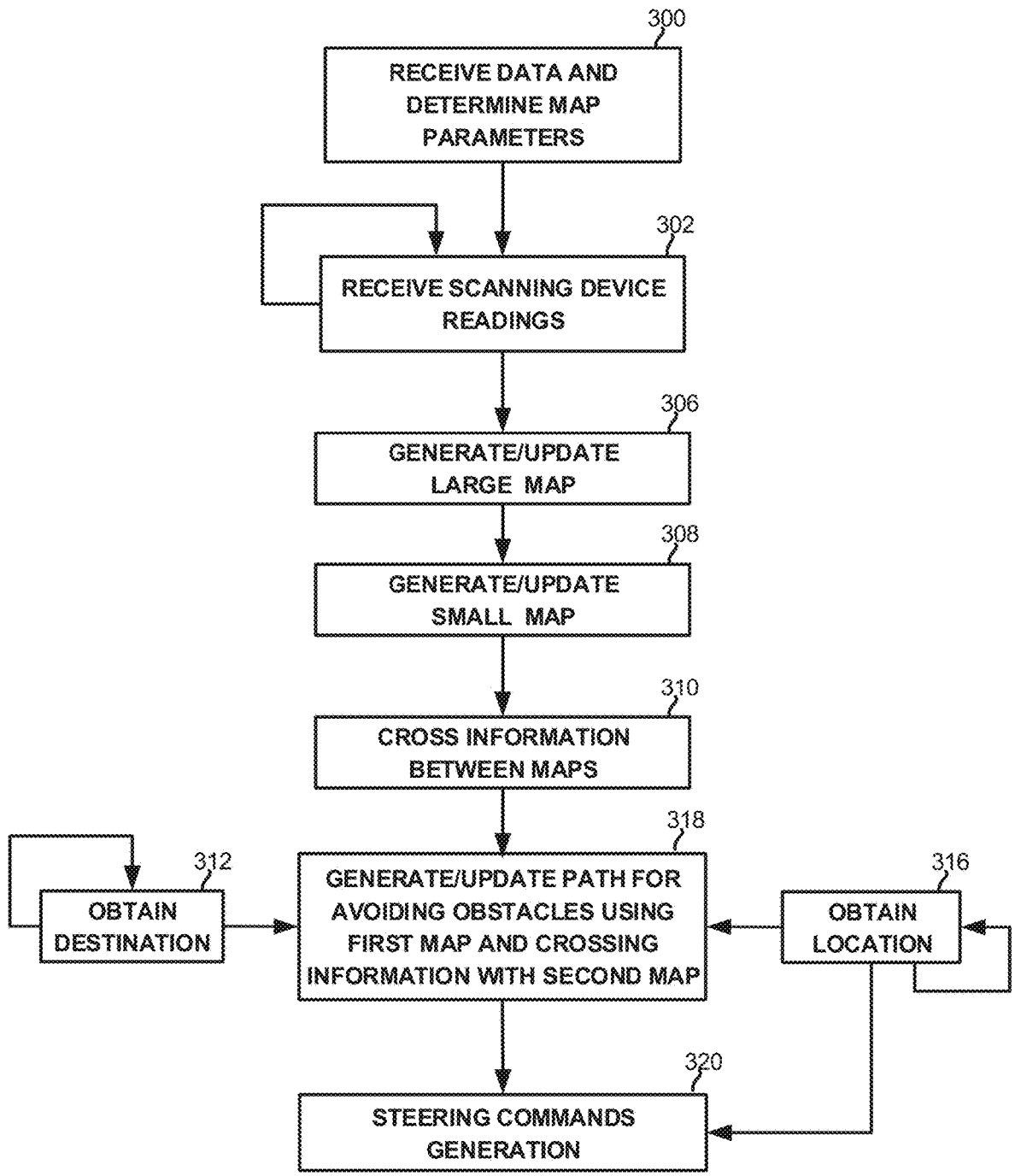
FIG. 3 illustrates a generalized flow-chart of a method for navigating a UGV in the presence of obstacles using two maps, in accordance with certain examples of the presently disclosed subject matter.
Figure 6:
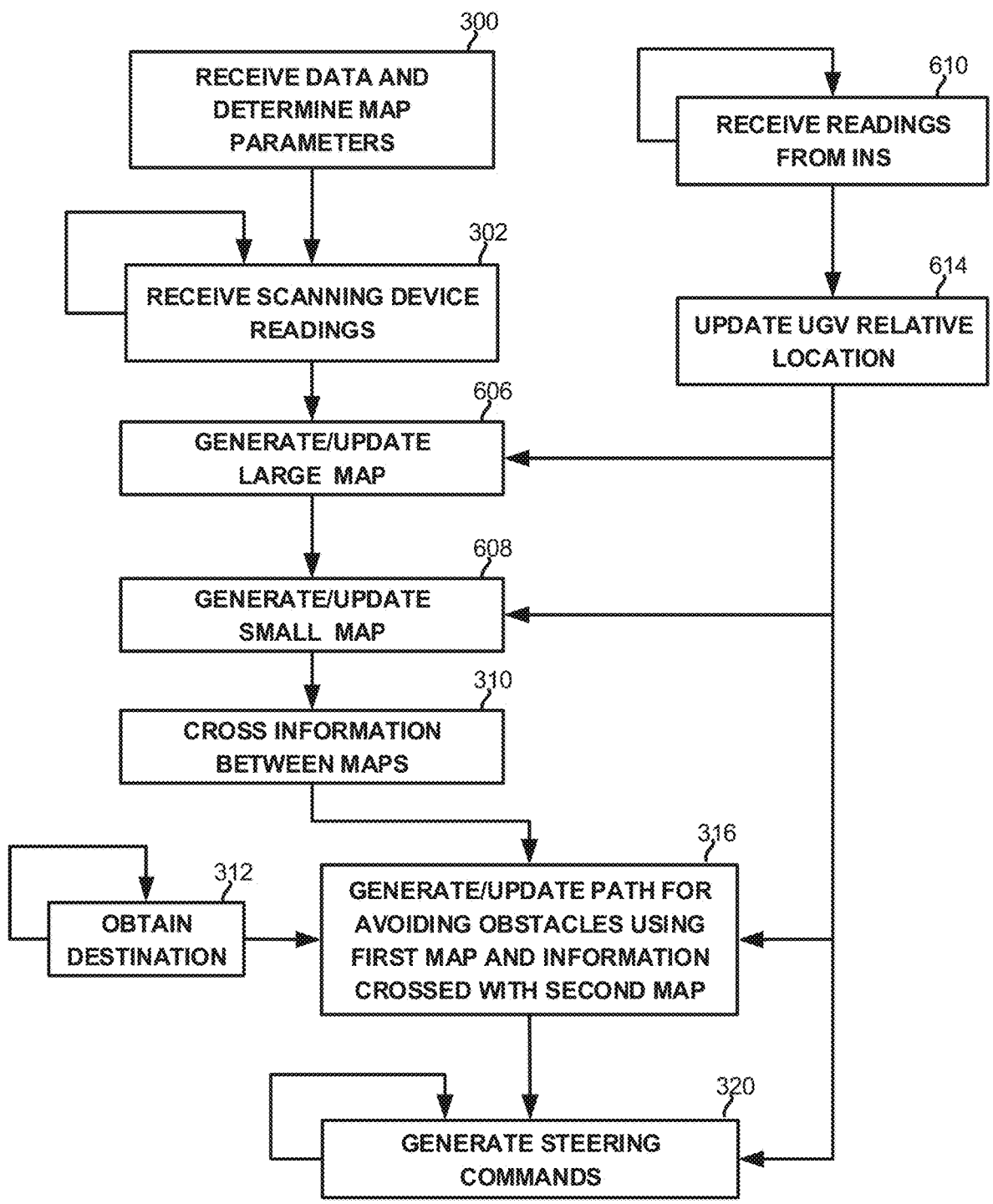
FIG. 6 illustrates a generalized flow-chart of a method for navigating a UGV in the presence of obstacles using two maps and an INS, in accordance with certain examples of the presently disclosed subject matter.

FIGS. 3 and 6 are flowcharts illustrating operations of respective processes, in accordance with the presently disclosed subject matter. In embodiments of the presently disclosed subject matter, fewer, more and/or different stages than those shown in FIGS. 3 and 6 may be executed. In embodiments of the presently disclosed subject matter one or more stages illustrated in FIGS. 3 and 6 may be executed in a different order and/or one or more groups of stages may be executed simultaneously. For example, block 306 in FIG. 3 can be executed together or following the execution of block 308.

Figure 1:
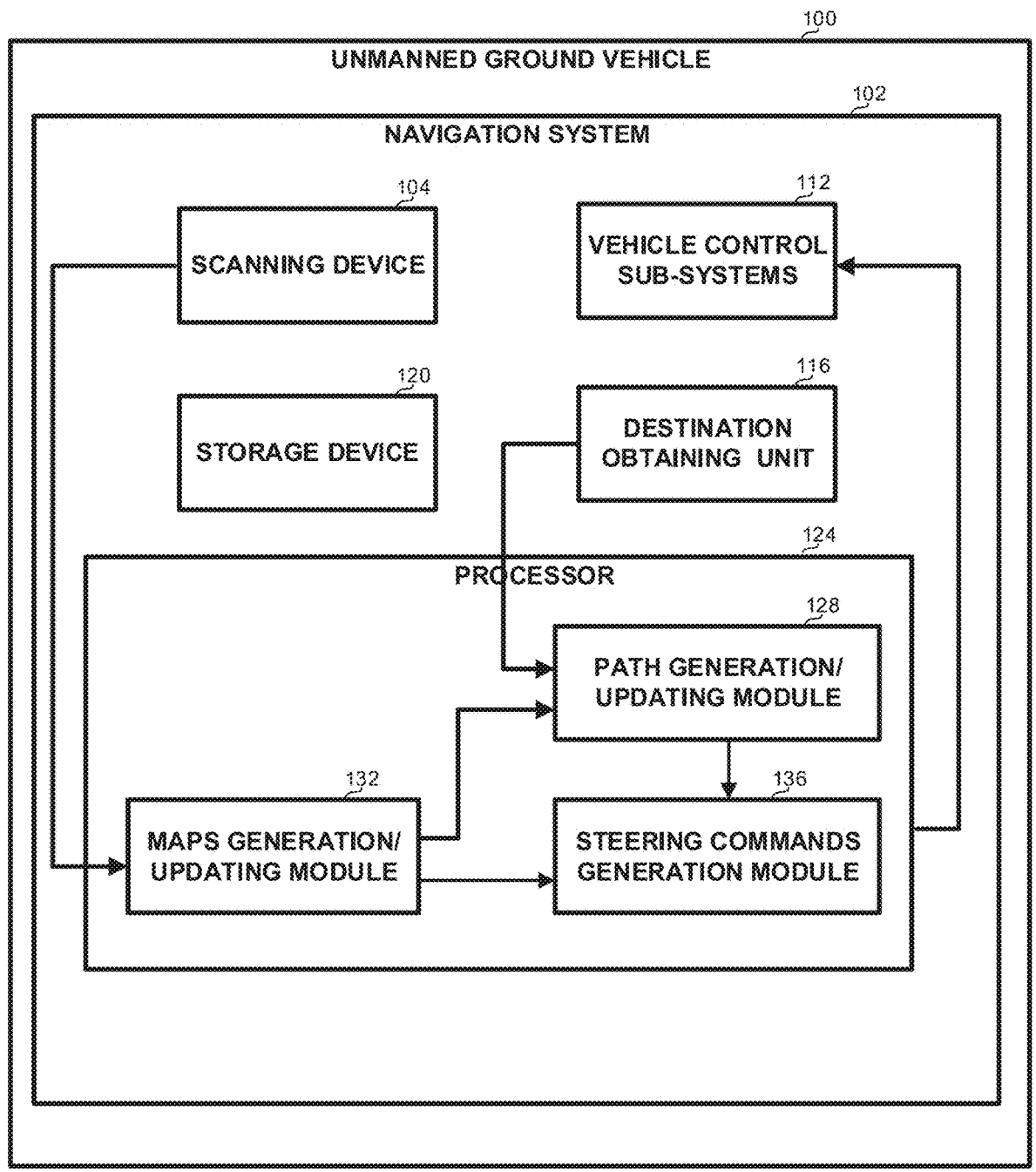
FIG. 1 illustrates a schematic block diagram of a navigation system of a UGV, in accordance with certain examples of the presently disclosed subject matter.
Figure 5:
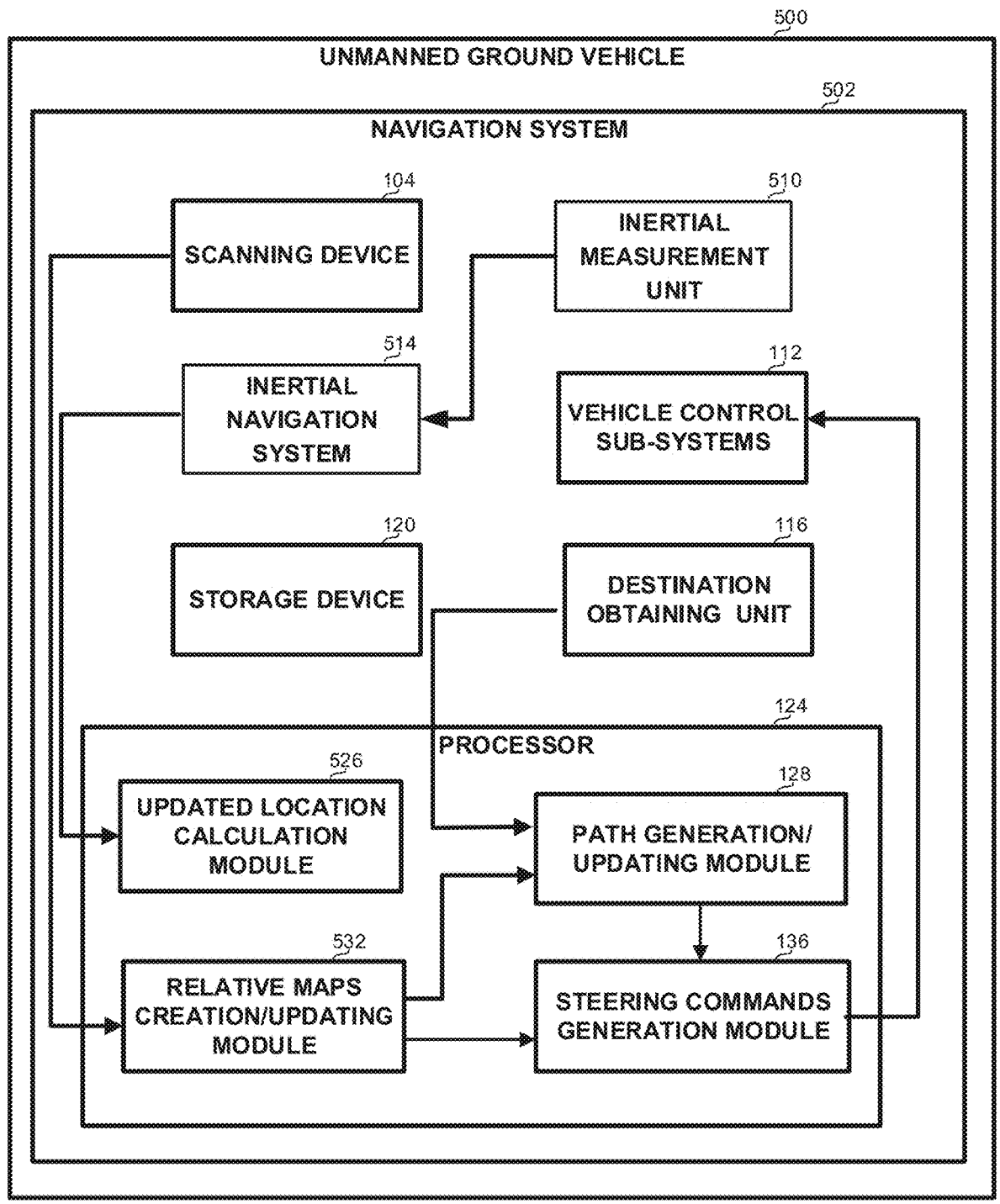
FIG. 5 illustrates a schematic block diagram of a navigation system of a UGV using two maps and an INS, in accordance with certain examples of the presently disclosed subject matter.

FIGS. 1 and 5 illustrate a general schematic of the system architecture in accordance with an example of the presently disclosed subject matter. Each module in FIGS. 1 and 5 can be made up of any combination of software, hardware and/or firmware that performs the functions as defined and explained herein. The modules in FIGS. 1 and 5 may be centralized in one location or dispersed over more than one location. In different examples of the presently disclosed subject matter, the system may comprise fewer, more, and/or different modules than those shown in FIGS. 1 and 5.

The term "unmanned ground vehicle" (UGV) as used herein should be expansively construed to include any kind of a vehicle that can be operated either autonomously, by a tele-operator, or by an on-board driver who cannot see the environment and steers the vehicle e.g. in accordance with a map or with explicit steering instructions. A UGV in accordance with the description is equipped with a scanning device configured to scan the area surrounding the UGV, and an INS configured to provide positioning data of the UGV.

The term "scanning device" as used herein should be expansively construed to include any kind of device configured to identify that an object is present at a specific distance and at a specific direction relative to the device. Examples of scanning devices include, but are not limited to: laser scanners (including LIDAR), RADAR, images sensor, sonar, etc. A scanning device can scan for example, 360° on a plane surrounding the device, or in some other smaller scanning angle (e.g. 180°). Alternatively, the scanning device can scan a sphere or part thereof around the UGV. A scanning device can provide information for generating a 3-dimensional map of the scanned area. In some examples, in order to save resources, a 2.5-dimensional map can be generated, as detailed below.

The term "map" as used herein should be expansively construed to include any data structure representing a geographical area. A map can be absolute, i.e., comprise indications of absolute coordinates of an object or a location, or relative, i.e., comprise information on locations or objects, regardless of their locations in absolute coordinates. A map can be represented on a computerized display device, on paper, or on any other tangible medium. In some examples of the disclosure, a 2.5-dimensional map can be generated and used. A 2.5-dimensional map relates to a map which indicates the lowest height of an obstacle above the ground, i.e., the vertical distance between the ground and the obstacle at each ground location. In other words, there is provided, for each ground location, the height of the free space above the ground. Thus, the information indicates, for each location, the clearance height for a UGV, for example the lowest height of a treetop or a bridge at a certain point. It will be appreciated that for obstacles that are on the ground, such as a house or a trunk of a tree, this height can be indicated as zero. The clearance height can be taken into account for path planning purposes, when determining, for example, whether the UGV can pass under a tree or a bridge.

Reference is now made to FIG. 1, showing a schematic block diagram of a navigation system of a UGV, in accordance with some examples of the disclosure.

UGV 100 comprises navigation system 102. It will be appreciated that navigation system 102 can comprise components, some of which can also serve other purposes, and that components of navigation system 102 can be located at different parts of UGV 100. Further, navigation system 102 can also receive services from and communicate with other components of UGV 100.

Navigation system 102 can comprise or be otherwise operatively connected to a scanning device 104 configured to scan an area surrounding the vehicle, and provide scanning output data for generating maps, as further described below.

Navigation system 102 can further comprise or be otherwise operatively connected to vehicle control sub-systems 112 including for example steering control unit, gear control unit, throttle control unit, etc. Vehicle control sub-systems 112 are configured to receive vehicle control instructions (e.g., steering commands) and control UGV 100 accordingly. The instructions can be absolute or relative, for example an absolute instruction can be "go 20 m north", while a relative instruction can be "continue straight for 20 m" or "gas 30%, yaw rate 50%".

Navigation system 102 can further comprise destination obtaining unit 116 for obtaining a destination to which UGV 100 has to arrive. Destination obtaining unit 116 can comprise or utilize components such as but not limited to a Global Positioning System (GPS), a communication unit for receiving a location or instructions from an external source, a camera and a computerized vision system for capturing images of the environment and identifying in the images a predetermined sign indicating a target destination. The indication can include for example visible or invisible light, a predetermined gesture performed by a person or a machine, or the like.

UGV 100 can further comprise computer storage device 120 for storing information such as one or more maps, information on obstacles, navigation instructions, or the like.

Navigation system 102 can further comprise or be otherwise operatively connected to one or more processing units for controlling and executing various operations, as disclosed herein. Each processing unit comprises a respective processing circuitry comprising at least one computer processor which can be, for example, operatively connected to a computer-readable storage device having computer instructions stored thereon to be executed by the computer processor.

According to one example, different functional elements (units, modules) in navigation system 102 can be implemented as a dedicated processing unit comprising a dedicated computer processor and computer storage for executing specific operations.

Additionally or alternatively, one or more functional elements can be operatively connected to a common processing unit configured to execute operations according to instructions stored in the functional elements.

For example, navigation system 102 can comprise a computer or processing unit (e.g. processor 124), which can be configured to execute several functional modules in accordance with computer-readable instructions stored on a non-transitory computer-readable medium (e.g. storage device 120) operatively connected to processor 124. For illustrative purposes such functional modules are referred to hereinafter as comprised in the processor.

Processor 124 can comprise by way of example, path generation or updating module 128, maps generation and updating module 132, and steering commands generation module 136.

Maps generation or updating module 132 can be configured for receiving readings from scanning device 104 and creating or updating at least a large map and a small map representing large and small areas, respectively, and comprising cells representing large and small parts of the areas, respectively.

In some examples, since scanning device 104 scans around UGV 100, the maps can represent UGV 100 at their centre, and represent obstacles in locations relative to UGV 100. As part of the maps creation or updating, information related to one or more obstacles can be crossed, and the obstacles, or the cells containing the obstacles in either map, can be classified accordingly, as detailed below.

Path generation or updating module 128 can be configured to determine a path from a current location of UGV 100 to the obtained destination, wherein the path avoids obstacles. According to one example, the path planning is generally based on the large map, but can use information on the obstacles obtained by crossing information from the two maps, as detailed below.

Steering commands generation module 126 can be configured to generate steering commands for controlling UGV 100. Steering command can be generated for example for following the planned path, based on the path and on a current location of UGV 100. For example, if UGV 100 gets too close to an obstacle, steering commands can be generated so as to keep UGV 100 at a safe distance from the obstacle. UGV 100 advances in accordance with the steering commands within the area adjacent to UGV 100. Accordingly, in some examples, the commands are generated in accordance with both maps, wherein the instruction generation includes crossing information between the maps, as detailed below.

Figure 2:
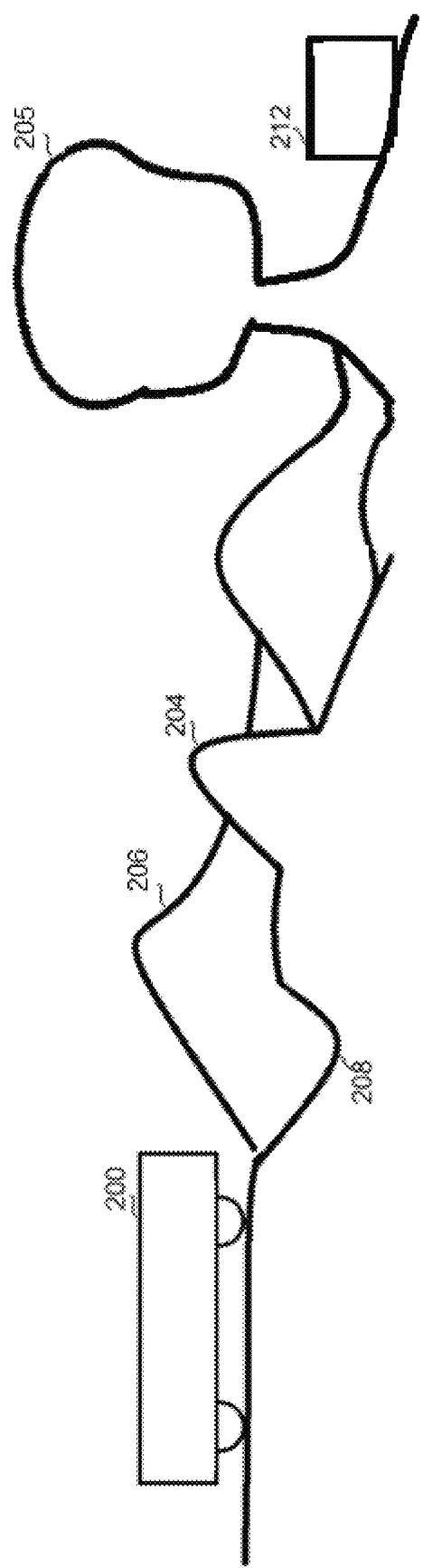
FIG. 2 shows a schematic illustration exemplifying an environment in which a UGV has to navigate.

Referring now to FIG. 2, this shows a schematic illustration of an example of an environment in which UGV 200 has to navigate from a current location to target location 212. The environment may comprise obstacles such as positive obstacle 204, which is above ground level, negative obstacle 208 which is below ground level, overhead obstacle 205 such as a tree or a bridge, steep terrain 206 which may be for example a back, side or front slope. All these obstacles are non-traversable for UGV 200 and have to be avoided. It will be appreciated that some objects present an obstacle when accessed from one side, but not when accessed from another side. For example, a ramp may present an obstacle when accessed from the side, but not when accessed from the front or back.

Traditional methods for navigating within an area in the presence of obstacles include generating a map of the area comprising indications of obstacles and optionally a target location or destination and using the map for planning and tracking a path. Although using a high resolution map of an area as large as possible (e.g., largest area for which information is available) can serve the two purposes, creating such a map is costly in terms of time and computer resources. Due to these limitations, these types of maps cannot be created and updated as often as required while the UGV advances. Moreover, planning a path based on such maps can also require intensive computations, due to the large amount of data.

Thus, some examples of the disclosure include generating a small map and a large map, and crossing information related to obstacles between the two maps.

Generating and using two maps provides for executing the required operations while benefiting from the advantages of a high resolution map in spite of limited computer processing resources, including, for example, time, storage space and processing power. Thus, in some examples larger scale operations including planning a path can be performed using a large area low-resolution map, while local operations, such as generating steering commands (including commands directed for avoiding obstacles), are done using a smaller high resolution map. Operations can be executed using information crossing between the two maps.

Referring now to FIG. 3, this shows a method for navigation within an area. Operations are described below with reference to elements in FIG. 1, however this is done by way of example only and should not be construed as limiting.

At block 300, information including data characterizing the area to be traversed as well as the operational parameters of UGV 100 and navigation system 102 are received. For example, processor 124 can receive (300) such information at the onset of vehicle navigation. The data can include, but is not limited to, the size or location of the area to be traversed, obstacle density, UGV maximal or average velocity within the terrain, scanning distance, scanning angle (360° or less) and scanning resolution (e.g. every 1°, 2°, etc.) of one or more scanning devices comprised by the UGV, maximal or expected velocity of the UGV within the area, or the like. Processor 124 can be configured to determine map parameters of two or more maps, such as the size of the area represented by each map, map cell size for each map, or the like, as detailed below. It will be appreciated that in some examples the maps representing the area surrounding the UGV are square. However, in other examples the map can be rectangle, or have some other shape.

At block 302 data is repetitively received from a scanning device, such as scanning device 104 of FIG. 1. The scanner is operated to scan an area around the vehicle and generate scanning output data, comprising one or more readings of distances from the UGV to objects at any direction. A processor such as processor 124 can receive the scanning data output. The scanner is operated to provide the readings repeatedly, at a rate depending on the device capabilities, user settings, or the like. The readings can be received for a full cycle (360°) around the device, or for a smaller angle, such as 180°, 270°, or the like. The readings can be received at a predefined resolution, such as every 0.5°, every 1°, every 2°, or the like, horizontally and vertically. It will be appreciated that scanning output data can be received from multiple scanners operatively connected to the UGV, which can be combined for generating the maps. It will be appreciated that the height of various objects in the area of the UGV can be determined upon the readings in various vertical directions, thus providing 3-dimensional information. However, in order to save resources, a 2.5-dimensional map can be generated, updated and used, as detailed above.

At blocks 306 and 308, a large map and a small map, respectively, can be generated when the first readings are received, and then re-generated or updated upon receiving subsequent readings. It will be appreciated that the maps can alternatively be generated or updated in the reverse order or simultaneously. The maps can be generated or updated based on the scanning output data, e.g., by processor 124 executing maps generation or updating module 132. It will be appreciated that the maps are initially generated based upon scanning output data received from scanner 104, after which the maps can be updated based on further scanning output data. According to some examples, each map can be generated and updated such that it is centred around the UGV and the locations of obstacles in the area of the UGV are indicated relative to the UGV. It will be appreciated that the maps generation can also utilize additional information, such as existing roads, information on areas that can or cannot be traversed, information obtained from image analysis, information indicating whether certain objects are obstacles or not, or the like, which may be obtained from other sources.

Each map can comprise a grid of cells, wherein each cell represents part of the map area. According to some examples each cell is classified to one of the at least following classes: non-traversable cell (i.e., representing an area comprising an obstacle or part thereof that should thus be avoided); and traversable cell (i.e., representing an area not comprising an obstacle). In some examples, a cell can also be classified as unknown.

It will be appreciated that initially all cells can be classified as unknown. As the UGV gets closer to areas represented by unknown cells, their class can become clear and they can then be classified into traversable or non-traversable. Otherwise, in some examples, determining whether an area represented by a cell with unknown class is traversable or not, can be based on the specific task to be performed, or other factors.

A cell is classified in accordance with the readings related to locations represented by the cell. In some examples, a scanner reading, indicating an obstacle within an area represented by a cell, renders the whole cell non-traversable. In other examples, a multiplicity of such readings can be required in order to render the cell non-traversable, such that false indications resulting from noise are avoided. It will be appreciated that in other examples, further criteria can be applied for classifying a cell as traversable or non-traversable. However, a cell classified as traversable ensures that the area represented by the cell is free of obstacles.

In some examples, readings can be received from multiple scanners and integrated. In such cases, an area can be indicated as non-traversable with or without regarding the number of scanners that provide readings related to the area represented by the cell.

In some examples, additional information can be associated with one or more cells on either map, or with obstacles if the internal representation also maintains a collection of obstacles. For example, a non-traversable cell or obstacle can be associated with a size indication, for example tiny, small, medium, large and huge, or any other scale, wherein the size indication can be determined in accordance with the obstacle area, at least one dimension of the obstacle, or a combination thereof. In a non-limiting example, a tiny object indication can be assigned to an object having an area up to the area of one small cell (i.e. cell of the small map), a small object indication can be assigned to an object having an area up to the area of one large cell (i.e. cell of the large map), a medium object indication can be assigned to an object having an area up to the area of four (2*2 or 1*4) large cells, a large object indication can be assigned to an object having an area up to the area of (3*3, 4*2 or the like) nine large cells, and a huge object indication can be assigned to any object taking up an area of more than nine large cells. It will be appreciated, though, that other indication schemes can be used, such as small, medium and large. It will be further appreciated that the indications can vary in accordance with the type of vehicle, the available resolution, the terrain, the task to be performed, or the like.

It will be appreciated that the size indication associated with an obstacle can be determined by the total size of cells indicated as non-traversable in one or more of the maps. For example, an obstacle taking up at least 3*3 cells in the large map can be considered a huge obstacle based on the large map only, an obstacle taking up one cell located on an edge of the small map can be indicated as small, medium, large or even huge if it takes up two or more cells in the large map, depending on the number of cells it takes up in the large map; an object taking up one cell in the large map can be indicated as tiny or small if it takes up one or two cells in the small map, respectively, or the like. The size can be determined, maintained in association with the obstacle, and re-used when constructing further maps, such that some real-time calculations can be avoided. Thus, for example, even if a small portion of an obstacle is shown at an edge of a map, an indication that the object is large can be available, and vice versa: an object taking up one, two or more cells in the large map can still be tiny or small, for example if the obstacle is located on the border of two or more cells, or on a corner of four cells.

In some examples, obstacles or cells comprising obstacles can also be classified into types, based on the obstacle shape or on predetermined knowledge. For example, an obstacle having a small area but significant height can be classified as a column. Obstacles can also be classified based on whether they are positive, i.e., above ground level, or negative, i.e. below ground level, such as a ditch.

In some examples, the large map can represent an area of 50-200 meters in each dimension, and each cell can represent an area of about 40-100 cm in each dimension.

In some examples, the small map can represent an area of 5-30 meters in each dimension, and each cell can represent an area of about 10-30 cm in each dimension.

In some examples, both maps are centred around the UGV, thus the area represented by the small map is generally represented by the large map as well, but with coarser resolution.

Figure 4:
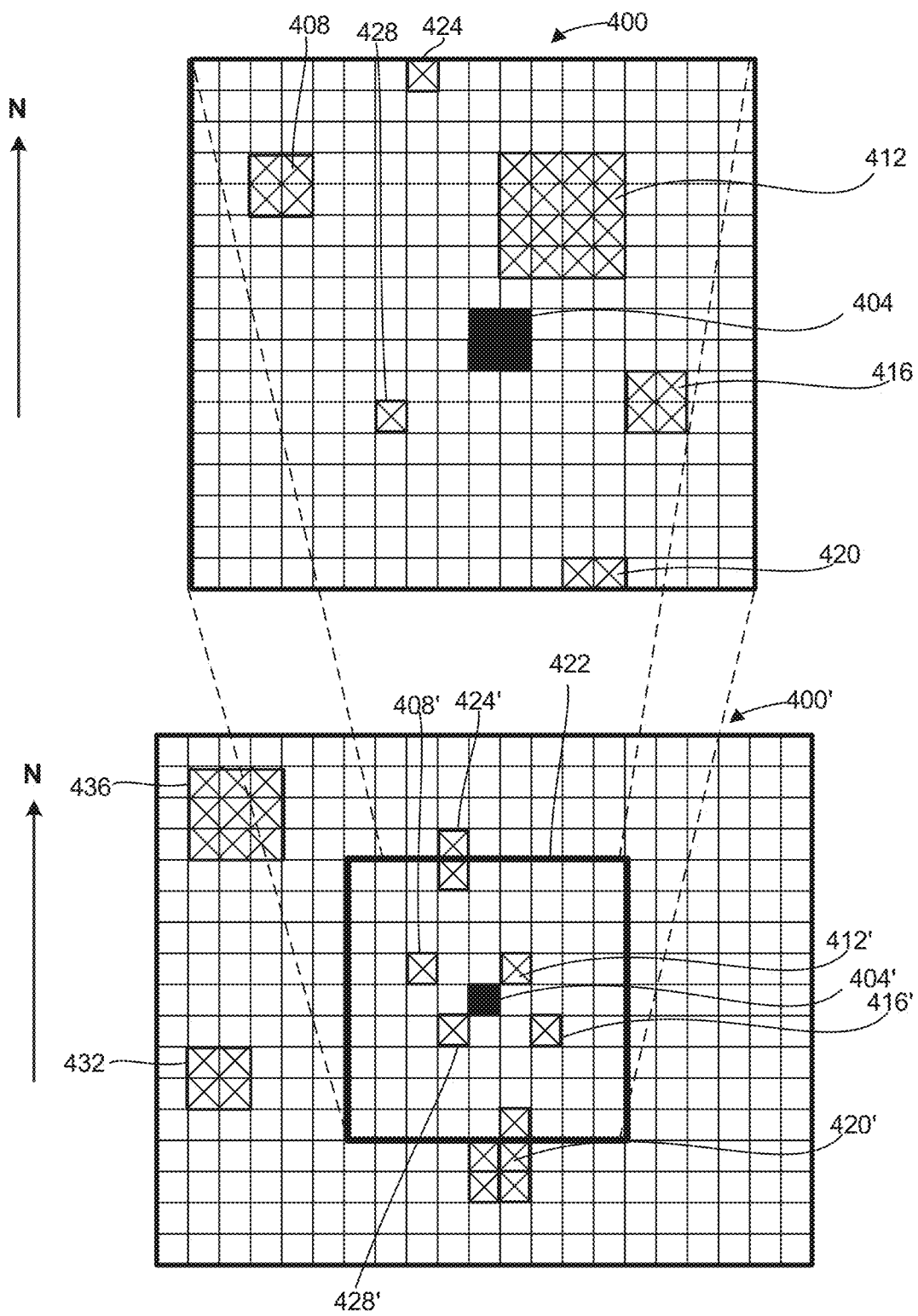
FIG. 4 illustrates visual representations of two maps of an environment, in accordance with certain examples of the presently disclosed subject matter.

Reference is now made also to FIG. 4, showing a pair of maps 400 and 400' according to one non-limiting example presented for the purpose of demonstrating certain principles of the presently disclosed subject matter. Map 400 represents an area, sized for example any one of: 5 m*5 m, 12 m*12 m, 24 m*24 m or the like, wherein each cell represents an area of any one of: 0.1*0.1 m, 0.2*0.2 m, or the like. Map 400' represents a larger area, for example any one of: 30 m*30 m, 50 m*50 m, 70 m*70 m, or the like, wherein each cell represents an area of any one of: 0.5*0.5 m, 0.8*0.8 m, or the like.

In the non-limiting example of FIG. 4, each cell of map 400' is represented as four (2*2) cells in map 400. Thus, map 400 represents a smaller area at finer resolution than map 400'. The area covered by map 400 is shown in map 400' as area 422, as also indicated by the dashed lines.

Maps 400 and 400' can be created, as described in association with blocks 306 and 308 above, based on readings provided by the scanning device, and represent the respective areas at a particular point in time. It will be appreciated that at other points of time, due to new readings obtained after the UGV has moved, the obstacles can be located at different places relative to the UGV. Some obstacles, such as humans or animals, can appear or disappear in subsequent maps.

Maps 400 and 400' are centred around UGV 404, and show obstacles in the respective areas. The obstacles represented as areas 408, 412, 416, 420, 424 and 428 of map 400 are shown also in map 400' as areas 408', 412', 416', 420', 424' and 428', respectively. It will be appreciated that obstacles are represented as cells, wherein each cell in each map is indicated as either traversable or non-traversable. According to the presently disclosed subject matter, an "all or nothing" rule is implemented which defines that an obstacle located within the area of a cell renders the entire cell as non-traversable, even if the obstacle covers only part of the cell area. Thus, even an obstacle that is significantly smaller than the size of the area represented by a cell will cause at least one cell to be indicated as non-traversable. Due to this discretization, the obstacle sizes in maps 400 and 400' are not necessarily proportional, and sometimes not even of the same shape. For example, a small obstacle that is located within one cell of the small map will cause that small cell to be indicated as non-traversable, while the same obstacle when located at the corner of four cells and partly overlapping four cells of the large map, will cause the four large cells to be classified as non-traversable. It will be appreciated that the opposite case is also possible, wherein an obstacle is located within one large cell, but on the corner of four small cells. Even further, if the obstacle is located on the border between two small cells (covering a part of each cell area), the two small cells will be indicated as non-traversable, resulting in different proportions for the obstacle in the two maps. For example, an obstacle depicted on the border of two small cells will be shaped as a rectangle, while the same obstacle when located within one large cell will be shaped as a square. In another example, as a result of the 'all or nothing' rule, an obstacle covering a single cell 428 in the small map, can also cause a corresponding single cell 428' in the large map to be classified as non-traversable. Crossing information between the two maps will show that the actual obstacle is smaller than the area of a cell in the large map.

Map 400 can be used for planning a path to a destination, wherein obstacles are to be avoided. Commands for steering the UGV can then be provided based on map 400', upon the tracked changes in the location of the UGV.

Planning the path and generating the commands can include crossing information (block 310) between the maps in one or more ways as detailed below.

Crossing the information (block 310) can be performed by processor 124 during execution of maps generation or updating module 132. Alternatively, operation described with reference to block 310 can be performed as part of other operations described with reference to other blocks such as block 318 or block 320, which are detailed below.

Crossing the information between the maps can include associating one or more obstacles with attributes, based on information from the large map and the small map.

For example, the size of an obstacle represented by a single non-traversable cell in the large map can be determined to be smaller than the cell size of the large map, if it is represented by one or more cells in the second map that cover an area which is smaller than the area of the large cell. For example, if the obstacle is represented in the small map by a single non-traversable cell (overlapping in location with the location of the obstacle in the large map) then the obstacle is of size equal or smaller than a small cell. In such cases, the obstacle can be treated differently, for example ignored or overrun, or the vehicle can possibly run over an area that is part of the large cell without hitting the obstacle.

It will be appreciated that comparing the obstacle size between the maps can also be performed for obstacles taking two blocks of the large map having a common edge, wherein the obstacle is located on the border and has partial overlap with the area represented by each cell. Similarly, an obstacle can be located on a corner common to three or four cells of the large map and occupy part of the area represented by each cell. Thus, in this case, an obstacle or a cell in the large map can be classified as tiny if its size is represented by at most a single cell in the small map, or small if its size is represented by at most a single cell in the large map. It will be appreciated that further attributes can be considered, for example a height of the obstacle e.g., a box having height of 20 cm can be ignored, while a three-meter pole cannot be ignored.

In another example, an obstacle represented as one or more non-traversable cells located on an edge of the small map, for example on the first or last row or column of cells of the small map, can be determined to be larger than the obstacle's area, as inferred from the small map. Such indication can be deduced from one or more non-traversable cells of the large map representing areas adjacent to the relevant small cell(s). Thus, in this example, an obstacle or a cell in the small map can be thus indicated as a large obstacle.

Referring back to FIG. 3, at block 312, a destination to which the UGV has to arrive, can be obtained, for example by processor 124. The destination can be represented as absolute or relative coordinates. The destination can be obtained for example via a communication channel. Alternatively, the destination can be obtained by manually or automatically searching and identifying a predetermined sign indicating the target destination. The predetermined sign can be for example, a pointer emitting visible or invisible light, a location in which a predetermined gesture is performed by a person or a machine, or the like. It will be appreciated that the mentioned options are provided by way of example only and any other method of obtaining a destination can be used instead. In some examples, the destination can change during navigation.

At block 316, a location of the UGV can be obtained, for example from a Global Positioning System (GPS) or from another source, for example an Inertial Navigation System (INS) associated with the UGV.

At block 318, a path is updated or generated from the current location to the destination to which the UGV has to arrive, for example by using the large map and additional information, including indications obtained by crossing the large map with the small map, such as indications of a small obstacle. The path generation or updating can be performed by processor 124.

The path can be determined so as to avoid obstacles indicated in the maps by non-traversable cells. The path determination can also take into account dangerous objects as determined from a 2.5-dimensional map, for example steep or otherwise dangerous slopes. However, path determination can also be performed upon a 2-dimensional or 3-dimensional map. Path determination can also take into account objects such as ramps. Ramps may constitute a traversable slope when accessed from one or more directions, for example the ascending or descending direction, and a non-traversable obstacle when accessed from the side, a direction from which the ramp may constitute a dangerous slope.

Path generation or updating block 128 can use any path planning method that is currently known or will become known in the future. The path can include one or more way points. The path determination can take into account additional data characterizing the environment, such as existing roads which are to be used or avoided such that they are not damaged by the UGV.

The path can be updated in response to new scanning output data received from the scanning device, in response to update in the destination, or in response to update in the location of the UGV.

At block 320 steering commands are generated for the UGV, in order for the UGV to track the planned path. The steering commands can be generated in response to update in the location of the UGV, which can be at a higher frequency than the map updates, for example every 2-50 milliseconds. Thus a steering command can be generated each time an indication of a location of the UGV is received, from a GPS system or any other source as disclosed below. Thus, one or more steering commands can be generated for each map update. During generation of the steering commands, the areas adjacent to the UGV can be taken into account, thus the commands can be determined based on the small map. However, generating the commands can consider the "large obstacle" indications that can be associated with one or more obstacles located on an edge of the small map, whose indications are obtained by crossing information with the large map.

Vehicle control sub-system can then steer the UGV in accordance with the commands.

It will be appreciated that the disclosed method can also be used with more than two maps, wherein each task of the UGV uses a map of the appropriate size and resolution, and information can be crossed between any two different maps.

In some examples, the disclosed subject matter can be used for navigating a UGV using a hybrid approach. In the hybrid approach, a path of the UGV is generated or updated using a large map of the environment and information crossed with a small map, as detailed above. The location of the UGV is repeatedly obtained from an Inertial Navigation System (INS) implemented as part of navigation system 102, or otherwise mounted on the UGV. INS data can comprise information on a change in the position, velocity and acceleration of the UGV since a previous reading, thus enabling a processor to determine an updated location of the UGV relative to the obstacles. Based upon the path and the updated location, steering commands can be generated for advancing the UGV in a safe manner. According to some examples, the commands are generated based upon the small map, with information crossed with the large map.

The INS provides for avoiding problems of other location-obtaining devices, such as GPS, which is insufficiently accurate and suffers from discontinuities which can lead to collisions with obstacles or entering non-traversable areas. In case readings from the INS are received at a higher frequency than the readings of the scanning device, the location of the UGV relative to the obstacles can be updated more often than the map updates. In such cases the steering commands can be generated to better adjust the advancement of the UGV within the area. For example, if the INS readings indicate that the UGV is at a distance smaller than a threshold from an obstacle, a steering command that keeps the UGV at a safe distance from the obstacle can be provided.

The cell size of the cells in each map can be selected to be larger than the maximal drift that can occur when calculating locations based on the INS during the traversal over some predefined distance (referred to herein as "free-inertial approach"; free inertial navigation approach is also described in patent application PCT/IL2018/050208 to the Applicant dated Feb. 22, 2018, which is incorporated herein by reference in its entirety). According to one example, the predefined distance is a distance which is equal to half the edge size of the area depicted by the associated map (assuming that the UGV is located at the center of the map). For example, if the large map represents an area of 70 m by 70 m, a deviation of one degree over half the length of the map (35 m) amounts to about 61 cm, (35*tan(1)=0.61). Therefore, if a cell size larger than 61 cm is selected for the large map, the presence of an obstacle, even an obstacle smaller than 61 cm, makes one or more cells of the large map in which at least a part of the object is comprised, into non-traversable. Therefore, since all obstacles are depicted relatively to the UGV, and wherein each cell of each map is larger than the possible drift over half the map size, then even without updating parts of the map while the UGV advances, which is an assumption that is stricter than the expected situation, the UGV can safely navigate without colliding into obstacles notwithstanding the inherent drift of the INS.

In some examples, the small map represents an area of 24 m by 24 m, wherein a deviation of one degree over half the length of the map (12 m) amounts to about 61 cm, (35*tan(1)=0.21). Therefore, each cell can represent an area of about 21 cm by 21 cm.

In other examples, the cell size can be selected in accordance with other conditions, such as the maximal drift over a full size of the map, or in accordance with other considerations.

Although theoretically, and under the assumption that limitation of resources such as time and processing power are disregarded, accurate path planning and navigation can be done using a large map with high resolution. This is not a possibility when using the free-inertial approach: since the area of each cell in the map is determined based on the INS drift over a certain distance, the predefined cell size sets a limit on the resolution of the map. Therefore reducing the cell size to increase the map resolution can be done only if the map size is reduced as well.

Thus, a combination of large and small maps as described above is required to remedy the deficiencies of any one map and provide a desired resolution as well as cover a desired mapped area (e.g., 70 m).

In some examples the maps are constantly updated, such that with every update the UGV remains at the center of each map, while the locations of obstacles in the area changes relative to the UGV. As the UGV advances within the area, peripheral areas of each map on the sides to which the UGV is advancing get closer to the center, and new areas are mapped and added to the map, while peripheral areas of the map on the other sides are not depicted in the updated map, since the covered area no longer includes them.

Reference is now made to FIG. 5, showing a navigation system of a UGV using two maps and an INS, in accordance with some examples of the disclosure.

Analogously to FIG. 1 above, UGV 500 comprises navigation system 502. Navigation system 502, similarly to navigation system 102 comprises scanning device 104, vehicle control sub systems 112, destination obtaining unit 116, storage device 120 and processor 124.

UGV 500 can further comprise inertial measurement unit (IMU) 510 providing acceleration data of the UGV, and inertial measurement system 514 tracking the position, velocity, and orientation of an object based on the IMU output data. In some examples, INS 514 comprises IMU 510 to form a self-contained navigation system which uses measurements provided by IMU 510 to track the position, velocity, and orientation of an object relative to a starting position, orientation, and velocity.

Processor 124, in addition to path generation/updating module 128 and steering commands generation module 136 detailed in association with FIG. 1 above, can also comprise updated location calculation module 526 for determining the location of the UGV relative to obstacles, based on a previous relative location and the change in the location as received from INS 514. Relative maps generation/updating module 532 is analogous to maps generation/updating module 132 of FIG. 1, wherein the maps are centred around UGV 500 and the obstacles are indicated at locations relative to UGV 500.

Reference is now made to FIG. 6, showing a flowchart of a method for navigating a UGV using two maps and an INS in the presence of obstacles, in accordance with some examples of the disclosure.

Analogously to FIG. 3 above, at block 30) information including data characterizing the area to be traversed as well as the operational parameters of the UGV 500 and navigation system 502 can be received, for example by a processor such as processor 124.

At block 302 data scanning output comprising one or more readings of distances from the UGV to the closest object at any particular direction can be received from scanning device 104. Scanning device 104 can be operated by processor 124, by an internal clock, or by any other component to perform scanning operations. The data is received repeatedly as new readings are provided.

At blocks 606, 608, at least a large relative map and a small relative map of the area can be generated or updated by relative maps generation/updating module 532, as detailed in association with blocks 306, 308 of FIG. 3 above. The maps are relative, such that the UGV is located at their center, thus the area represented by the small map is included in the area represented by the large map.

The size of the area represented by the large map can be determined in accordance with the range and accuracy of the scanning device. For example, a scanning range of 35 m in each direction with accuracy appropriate for the terrain and task, provides for a large map representing a square having an edge of double the scanning distance, i.e., 70 m.

In order for the small map to provide significantly higher resolution, the cell size of the small map can be selected, for example, to be 0.1 m*0.1 m, and the small map can cover an area of 14 m*14 m.

In some further examples, the square obtained in accordance with the calculated edge of either map can be further increased as follows: the scanner generally provides readings around the UGV, therefore a circumcircle can be defined for the square. Then, since round maps may be inconvenient, a circumgon square can be defined for the circumcircle. The map edge size can then be set to the size of the circumgon edge size. This amounts to multiplying the obtained distance by the square root of two, i.e., about 1.41. The instruction update rate can be set in accordance with the braking distance of the UGV in the specific terrain.

It will be appreciated, however, that the size of the area represented by either map can be determined in accordance with additional or different parameters, such as the size of the area to be traversed, the scanning range and precision of the scanning device, INS drift, computation capabilities available for the UGV, or other factors. According to some examples the size of the area represented by the large map is in the order of magnitude of tens of meters, such as 50 m to 200 m in each dimension, commands, and the size of the area represented by the small map is in the order of magnitude of tens of meters, such as 5 m to 30 m in each dimension.

At block 310, information can be crossed between the large map and the small map, e.g. by one or more of relative maps generation/updating module 532, path generation/updating module 128 or steering commands generation module 136. Crossing the information can comprise associating additional information with respect to one or more cells or obstacles. In one example, a small obstacle indication can be associated with an obstacle having overlap with areas represented by up to four cells in the large map, wherein the indication is determined based on the obstacle size as indicated in the small map. In another example, an object taking up a single cell on an edge of the small map can be indicated as a larger object if parts thereof are contained in two or more cells of the large map, in which case it seems as a single-cell obstacle in the small map only due to the relatively small map coverage area.

The combination of the two maps provides more accurate mapping data of the surrounding area that allows the generation of more accurate steering commands for manoeuvring the vehicle.

At block 312, a destination to arrive at can be obtained, as disclosed in association with FIG. 3 above.

At block 610, one or more readings are received from INS 514 (e.g. received by processor 124), indicating a current location of the UGV relative to a previous location. The readings can be provided by INS 514 at a rate depending on the capabilities of INS 514, user settings, or the like.

At block 614, the location of areas represented on the map by non-traversable cells relative to the UGV is updated (e.g. by processor 124) in accordance with the INS data. Although the location update relates to the UGV, it will be appreciated that updating the location of the UGV relative to the cells can be performed by maintaining the location of the UGV and updating the relative location of the cells.

In case an obstacle which has been identified in a previous scan is not detected in the latest scan, due for example to the proximity between the obstacle and the UGV, the obstacle updated location relative to the UGV can still be determined based on its previously determined location and in accordance with the updated INS data. The relative location can be used in updating the maps (blocks 606, 608).

At block 316 path to the destination which avoids the obstacles can be generated or updated, for example by path generation/updating module 128. The path can be based upon the large map, with the information crossed with the small map. For example, a tiny obstacle can be disregarded by the path. Generating or updating the path can thus use the maps, the destination and the updated location of the UGV relative to the obstacles as determined at block 614.

At block 320 steering command scan be repeatedly generated based on the path and the updated location, for example by steering commands generation module 136. Steering commands can be generated each time a map is generated or updated, or upon each update in the location of the UGV. The steering commands can be determined in accordance with the small map, while taking into account information crossed with the large map.

A steering module of the UGV can steer the UGV in accordance with the global path as updated using vehicle control sub systems 112.

It will be appreciated that any two of the cycles of obtaining the destination, receiving the scanning device readings and receiving the IMU readings, may, or may not be, synchronized. By way of a non-limiting example the scanning device readings can be obtained every 10-500 milliseconds, e.g., 25 milliseconds, and the IMU readings can be obtained every 2-50 milliseconds, e.g., 20 milliseconds. Steering commands can be issued for example at 2-20 Hz.

It is noted that the teachings of the presently disclosed subject matter are not bound by the described with reference to the components described on FIG. 1 and FIG. 5, and to the blocks described on FIG. 3 and FIG. 6. Equivalent and/or modified functionality can be consolidated or divided in another manner and can be implemented in any appropriate order or combination of software, firmware and hardware and executed on a suitable device.

Those skilled in the art will readily appreciate that various modifications and changes can be applied to the examples of the invention as hereinbefore described without departing from its scope, defined in and by the appended claims.

Examples of the presently disclosed subject matter are not described with reference to any particular programming language. It will be appreciated that a variety of programming languages can be used to implement the teachings of the presently disclosed subject matter as described herein.

The invention claimed is:

1. A method of autonomous navigation of a vehicle using an inertial navigation system (INS), the method comprising:
operating a scanning device onboard the vehicle for repeatedly scanning an area surrounding the vehicle, to thereby generate respective scanning output data;
operating a computer processor for:
generating, based on the scanning output data a first map representing at least a part of the area and characterized by a first map size; wherein the map comprises a first group of cells characterized by a first cell size which is equal or larger than an accumulated drift value of the INS over a first predefined distance which is related to the first map size;
generating, based on the scanning output, a second map representing a part of the area and characterized by a second map size, which is smaller than the first map size; wherein the map comprises a second group of cells characterized by a second cell size, smaller than the first cell size;
wherein the second map, at least partly overlaps the first map and wherein cells in the first group of cells and the second group of cells are classified to a class selected from at least two classes, comprising traversable and non-traversable and wherein non-traversable cells in the first map and the second map indicate obstacles;
generating deduced data by crossing between information about one or more cells in the first group of cells and about one or more cells in the second group of cells; wherein the deduced data provides a more accurate indication about size of obstacles located within the area;
receiving INS data from the INS that is indicative of a current location of the vehicle relative to a previous location; and
generating navigation instructions for leading the vehicle through the area while avoiding obstacles, based on the INS data the deduced data.

2. The method of claim 1 further comprising executing steering commands for controlling movement of the vehicle according to the navigation instructions.

3. The method of claim 1, wherein the crossing further comprising:
crossing between information about one or more cells from the first group of cells and information about one or more corresponding cells from the second group of cells, wherein the deduced data is indicative whether a size of a non-traversable area represented by at least one cell from the first group of cells is smaller than the size of the first cell size.

4. The method of claim 1, wherein the crossing further comprising:
crossing between one or more cells from the second group of cells that is classified as non-traversable and one or more corresponding cells from the first group of cells, wherein the deduced data is indicative whether a size of a non-traversable area represented by at least one cell from the second group is greater than the second cell size.

5. The method of claim 1, wherein the second cell size is equal or larger than an accumulated drift value of the INS over a second predefined distance, which is related to the second map size of the second map.

6. The method of claim 1, further comprising:
updating a path leading the vehicle to a target destination using the first map and the second map.

7. The method of claim 1, wherein the first predefined distance is determined to exceed a maximal distance expected to be travelled by the vehicle between consecutive map updates.

8. The method of claim 5, wherein the first predefined distance or the second predefined distance is derived from a size of any one of:
(i) a dimension of an area represented by the first map or the second map respectively;
(ii) half a dimension of an area represented by the first map or the second map respectively; and
(iii) a diagonal of the first map or the second map respectively.

9. The method of claim 1, wherein the vehicle is an unmanned ground vehicle.

10. The method of claim 1, wherein the first map and the second map are generated simultaneously.

11. The method of claim 1, wherein the first map or the second map is generated by accumulating scanning output data obtained as the vehicle advances.

12. A system mountable on a vehicle, comprising:
a scanning device configured to repeatedly scan an area surrounding the vehicle, to thereby provide scanning output data indicative of distances between objects in the area and the vehicle in a multiplicity of directions;
an Inertial Navigation System (INS for providing data indicative of a current location of the vehicle relative to a previous location;
one or more computer processors configured to:
generate, based on the scanning output data a first map representing at least a part of the area and characterized by a first map size; wherein the map comprises a first group of cells characterized a first cell size which is equal or larger than an accumulated drift value of the INS over a first predefined distance which is related to the first map size;
generate, based on the scanning output, a second map representing a part of the area and characterized by a second map size, which is smaller than the first map size; wherein the map comprises a second group of cells characterized by a second cell size, smaller than the first cell size;
wherein the second map at least partly overlaps the first map and wherein cells in the first group of cells and the second group of cells are classified to a class selected from at least two classes, comprising traversable and non-traversable and wherein non-traversable cells in the first map and the second map indicate obstacles;
generate deduced data by crossing between information about one or more cells in the first group of cells and about one or more cells in the second group of cells; wherein the deduced data provides a more accurate indication about size of obstacles located within the area;
receive INS data from the INS that is indicative of a current location of the vehicle relative to a previous location; and
generate navigation instructions for leading the vehicle through the area while avoiding obstacles, based on the INS data and the deduced data.

13. The system of claim 12 is further configured to execute steering commands for controlling movement of the vehicle according to the navigation instructions.

14. The system of claim 12, wherein the crossing comprises:
crossing between information about one or more cells from the first group of cells and information about one or more corresponding cells from the second group of cells, wherein the deduced data is indicative whether a size of a non-traversable area represented by at least one cell from the first group of cells is smaller than the first cell size.

15. The system of claim 12, wherein the crossing comprises:
crossing between one or more cells from the second group of cells that is classified as non-traversable and one or more corresponding cells from the first group of cells, wherein the deduced data is indicative whether a size of a non-traversable area represented by at least one cell from the second group is greater than the second cell size.

16. The system of claim 12, wherein the second cell size is equal or larger than an accumulated drift value of the INS over a second predefined distance, which is related to the second map size of the second map.

17. The system of claim 12 is further configured to update a path leading the vehicle to a target destination using the first map and the second map.

18. The system of claim 12, wherein the first predefined distance is determined to exceed a maximal distance expected to be travelled by the vehicle between consecutive map updates.

19. The system of claim 16, wherein the first predefined distance or the second predefined distance is derived from a size of any one of:
(i) a dimension of an area represented by the first map or the second map respectively;
(ii) half a dimension of an area represented by the first map or the second map respectively; and
(iii) a diagonal of the first map or the second map respectively.

20. The system of claim 12 is mountable and operable onboard an unmanned ground vehicle to provide the vehicle with improved obstacle classification and navigation capabilities.

21. The system of claim 12, wherein the one or more processors are configured to generate the first map and the second map simultaneously.

22. The system of claim 12, wherein the first map or the second map is generated by accumulating scanning output data obtained as the vehicle advances.

23. An autonomous vehicle comprising a system comprising:
- a scanning device configured to repeatedly scan an area surrounding the vehicle, to thereby provide scanning output data indicative of distances between objects in the area and the vehicle in a multiplicity of directions;
- an Inertial Navigation System (INS) for providing data indicative of a current location of the vehicle relative to a previous location;
- one or more computer processors configured to:
- generate, based on the scanning output data a first map representing at least a part of the area and characterized by a first map size; wherein the map comprises a first group of cells characterized a first cell size which is equal or larger than an accumulated drift value of the INS over a first predefined distance which is related to the first map size;
- generate, based on the scanning output, a second map representing a part of the area and characterized by a second map size, which is smaller than the first map size; wherein the map comprises a second group of cells characterized by a second cell size, smaller than the first cell size;
- wherein the second map at least partly overlaps the first map and wherein cells in the first group of cells and the second group of cells are classified to a class selected from at least two classes, comprising traversable and non-traversable and wherein non-traversable cells in the first map and the second map indicate obstacles;
- generate deduced data by crossing between information about one or more cells in the first group of cells and about one or more cells in the second group of cells; wherein the deduced data provides a more accurate indication about size of obstacles located within the area;
- receive INS data from the INS that is indicative of a current location of the vehicle relative to a previous location; and
- generate navigation instructions for leading the vehicle through the area while avoiding obstacles, based on the INS data and the deduced data.

24. A non-transitory program storage device readable by a computer, tangibly embodying a program of instructions executable by the computer to perform a method of navigating a vehicle using an Inertial Navigation System (INS), comprising:
- obtaining scanning output data generated by a scanning device that is configured for repeatedly scanning an area surrounding the vehicle and thereby generate the scanning output data;
- generating, based on the scanning output data a first map representing at least a part of the area and characterized by a first map size; wherein the map comprises a first group of cells characterized a first cell size which is equal or larger than an accumulated drift value of the INS over a predefined distance which is related to the first map size;
- generating, based on the scanning output, a second map representing a part of the area and characterized by a second map size, which is smaller than the first map size; wherein the map comprises a second group of cells characterized by a second cell size, smaller than the first cell size;
- wherein the second map at least partly overlaps the first map and wherein cells in the first group of cells and the second group of cells are classified to a class selected from at least two classes, comprising traversable and non-traversable and wherein non-traversable cells in the first map and the second map indicate obstacles;
- generating deduced data by crossing between information about one or more cells in the first group of cells and about one or more cells in the second group of cells; wherein the deduced data provides a more accurate indication about size of obstacles located within the area;
- receiving INS data from the INS that is indicative of a current location of the vehicle relative to a previous location; and
- generating navigation instructions for leading the vehicle through the area while avoiding obstacles, based on the INS data and the deduced data.

* * * * *